UNITED STATES PATENT OFFICE.

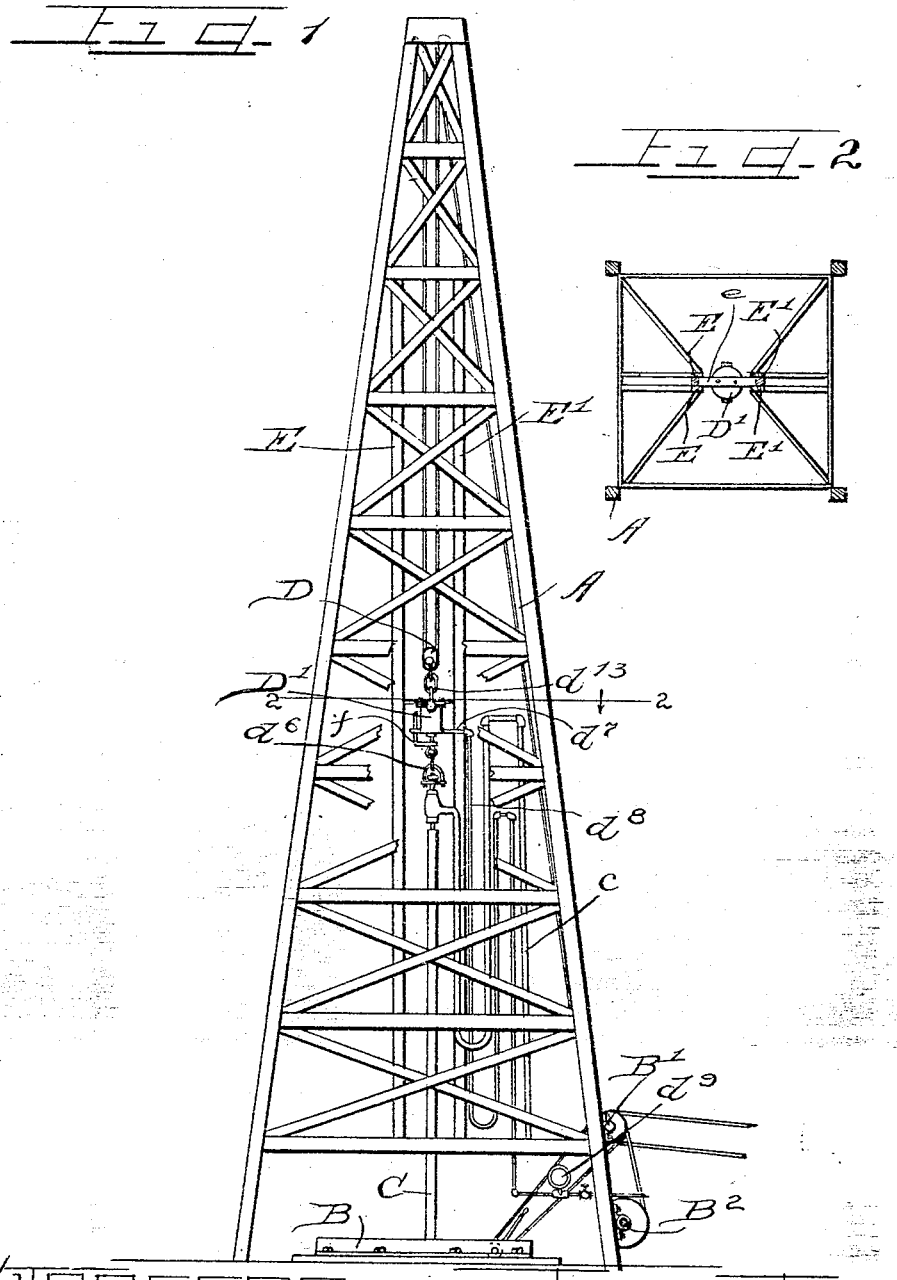

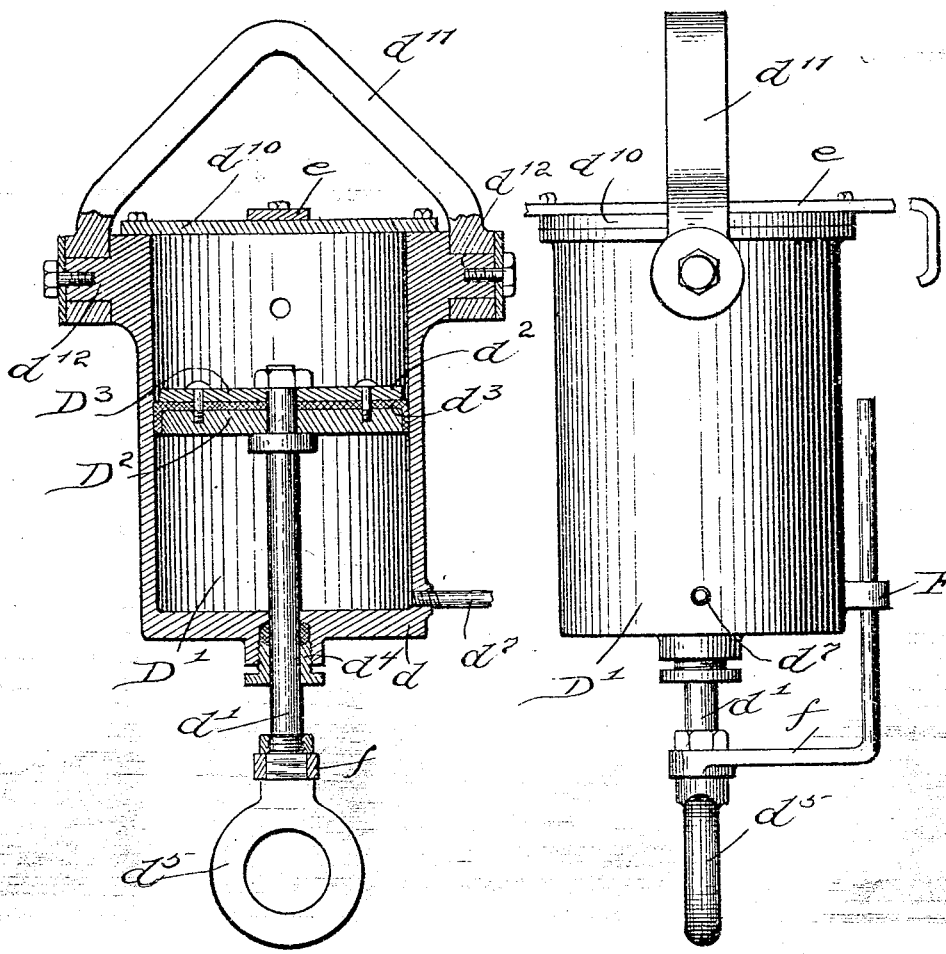

JAMES R. SHARP, OF CHICAGO, ILLINOIS.

HYDRAULIC WEIGHING AND FEEDING DEVICE.

No. 839,656.　　　　Specification of Letters Patent.　　　Patented Dec. 25, 1906.

Application filed January 26, 1906. Serial No. 297,953.

*To all whom it may concern:*

Be it known that I, JAMES R. SHARP, a citizen of the United States, and a resident of the city of Chicago, in the county of Cook and State of Illinois, have invented certain new and useful Improvements in Hydraulic Weighing and Feeding Devices; and I do hereby declare that the following is a full, clear, and exact description of the same, reference being had to the accompanying drawings, and to the letters of reference marked thereon, which form a part of this specification.

This invention relates to improvements in hydraulic weighing and feeding devices for use in well-drilling.

When drilling at a considerable depth, it is important to know and to regulate the pressure at which the tool is operating on the rock. This is particularly important in core-drilling, as too great pressure in many instances will damage the tool. Furthermore, in fishing for a tool it is very important to know when the grappling implements have engaged the tool and to enable the operator to determine if or not the tool is supported thereby.

The devices heretofore employed to accomplish these results are exceedingly large and have been secured upon the revolving table and are consequently inconvenient to the operator and tend to prevent the use of long pipe-sections and are therefore frequently omitted.

The object of the invention is to provide a cheap, simple, and thoroughly reliable device operated by hydraulic pressure or other fluid-pressure and whereby the weight supported thereon can at all times be determined by reference to a suitable gage positioned near the operator, whereby the pressure exerted by the drill can be instantly known and perfectly regulated.

It is furthermore an object of the invention to provide a device whereby in fishing the operator can instantly determine if the grappling instruments have engaged the lost tool.

Finally, it is an object of the invention to provide a device of the class described which is at all times ready for use and can never under any circumstances be in the way of the operator and the use of which enables standard pipe-sections to be employed.

The invention consists in the matters hereinafter described, and more fully pointed out and defined in the appended claims.

In the drawings, Figure 1 is a front elevation, partly broken, of a well-derrick and operating mechanism provided with means embodying my invention. Fig. 2 is a transverse section of the same, taken on line 2 2 of Fig. 1. Fig. 3 is an enlarged vertical section of the weighing and feeding mechanism. Fig. 4 is a side elevation of the same.

As shown in said drawings, A indicates as a whole the well-derrick, which may of course be of any suitable kind or construction and at the bottom of which is the usual revolving table, whereby the tool is rotated when in operation. This may be driven from any suitable source of power—as, for instance, a steam-engine—which is not shown and the power of which is communicated through any suitable arrangement to said table. As shown, a main shaft $B'$ is journaled on the side of the derrick, on which are suitable pulleys to receive the drive from the engine or motor and to communicate the same to the table B and also communicate the drive to the hoist $B^2$, which of course may be of any desired description and material. C indicates the pipe, which may be used in any suitable length of section and with which is connected a pipe $c$, whereby water is delivered into the pipe C as is usual.

The usual tackle is employed for hoisting and lowering the tool, and supported on the lower block D thereof is the weighing and feeding device. This comprises, as shown, a cylinder $D'$, having, as shown, an integral head $d$ at the bottom, in which is a central aperture containing a gland $d^4$, through which the piston-rod $d'$ extends. Said piston-rod is secured at its inner end to the piston $d^2$, which, as shown, comprises an upper and a lower plate $D^3$ $D^2$, between which is secured hydraulic packing $d^3$, having the edges turned downwardly, as shown in Fig. 3. At the lower end of said piston-rod is provided an eye $d^5$, adapted to receive a C-hook $d^6$ or other suitable means for engaging and supporting the pipe to permit rotation of the same. An inlet-pipe $d^7$ opens into the lower end of said cylinder and is connected, by means of a flexible hose $d^8$, with a source of water supply and pressure, and in said pipe is provided a gage $d^9$ of any suitable kind and on which the pressure may conveniently be indicated in pounds and may, if desired, also be indicated in feet for different sizes of tools. As shown, a removable head $d^{10}$ is bolted on the upper end of the cylinder, and a bail $d^{11}$ is pivotally engaged upon integral bosses $d^{12}$, one on each side of the cylinder at its upper end, and affords means for supporting said cylinder upon the hook of the block D. For this purpose a link $d^{13}$ of any suitable kind is employed, as shown in Fig. 1. Means are provided to hold said weighing and feeding device in alinement with the bore, and for this purpose ways E and E' are provided on each side of the center of the derrick and between which said cylinder is suspended and rigidly bolted on the head $d^{10}$, and extending between the ways is a bar $e$, which acts to prevent said device from swinging or rotating; also, as shown, means are provided to prevent the piston from rotating in the cylinder, and for this purpose an apertured lug F is provided on one or more sides of the cylinder near the bottom, and an arm $f$ is rigidly secured on the outer end of the piston-rod near the eye and extends laterally into alinement with said lugs and then upwardly through the same, as shown in Figs. 1 and 4, thereby preventing movement of the piston in the cylinder except longitudinally thereof.

The operation is as follows: When inserting or removing the tool from the well, the device need not be used and then may be disconnected and the pipe-sections connected directly to the block if desired. When the drill is in operation, it is important to know approximately the pressure exerted thereby on the rock at the bottom of the bore, and this is accurately shown by the weighing and feeding device, which is hung on the lower block and engages between the ways and the pipe is engaged thereon.

The lower chamber in the cylinder and pipe $d^8$ now being filled with water or other suitable fluid, the pressure is applied sufficient to raise the piston and the tool and pipe thereon, and the pressure required is read in pounds or other scale to indicate the actual total weight. The pressure is then reduced in said cylinder and pipe by as much as the pressure to be exerted by the tool on the rock and is maintained constantly until another pipe section or sections are added, when of course the pressure in the cylinder will be increased to balance the increased weight.

The pressure at which the tool engages at the bottom of the bore can be thus regulated and controlled by the operator in the cylinder D' by increasing the pressure within the cylinder to more nearly support the weight of the pipe, rod, and tool or reducing the pressure within the cylinder to sustain less of the gravity of the same, thus enabling the operator to graduate with the utmost nicety the operation of the tool to suit the character of rock or material operated upon and other conditions existing.

In fishing the device is particularly serviceable, inasmuch as it sometimes occurs that it is difficult to determine with certainty if or not the fishing or grappling tools have positively engaged the pipe or tool to be lifted and removed from the bore. This can of course be instantly determined by the use of the weighing and feeding mechanism or device, inasmuch as the pressure indicated upon the gage will instantly augment should the grappling-tools have caught the tool or pipe.

While I have described my invention as hydraulic in operation, obviously compressed air or steam may be employed, and I do not purpose limiting this application for patent otherwise than necessitated by the prior art, as obviously various details of construction may be varied without departing from the principles of my invention.

I claim as my invention—

1. A feeding and weighing mechanism of the class described embracing a hoisting-tackle, a cylinder supported thereon, a piston therein, a piston-rod extending downwardly through the head of said cylinder, means for preventing the piston from rotating within the cylinder, a pipe adapted for connection with a source of pressure and opening into the lower end of said cylinder and a pressure-indicating gage connected in said pipe convenient for inspection by the operator.

2. A feeding and weighing mechanism of the class described embracing a hoisting-block, a pipe-rod, a cylinder, a bail thereon adapted to be engaged on the hoisting-block, a piston within the cylinder, a piston-rod extending through the lower head and adapted to engage the pipe-rod, means on said piston-rod adapted to hold it from rotating within the cylinder, a pressure-pipe opening into the lower end of said cylinder, an indicator connected therein and means for varying the pressure within said cylinder.

3. In a device of the class described, a hoisting-tackle a hydraulic cylinder, a bail thereon adapted to afford means for supporting said cylinder upon the hoisting-tackle, a gland in the lower head of the cylinder, a piston within the cylinder, a piston-rod thereon extending through said gland, an eye in said rod for attachment with the pipe-rod, a pressure-pipe opening into the bottom of said cylinder and a gage in said pipe at a point convenient for the inspection of an operator and means holding the piston from rotation in the cylinder.

4. In a device of the class described, a well-derrick and its hoisting-tackle, a hydraulic cylinder, a bail pivoted at each side of the same, and adapted for engagement by the hoisting-tackle, central vertical guides on said derrick, a transverse bar on said cylinder provided with downturned ends adapted to engage in said guides and hold said cylinder over the bore, a piston in said cylinder adapted to support the tool, means admitting pressure into the cylinder and a gage to indicate pressure.

5. In a device of the class described the combination with the hoisting-tackle, of a fluid-pressure weighing and feeding mechanism supported on said tackle, a pressure-pipe leading therefrom, an indicator connected in the pipe at a point convenient for the inspection of the operator, a grooved guide on each side of the weighing mechanism and extending longitudinally of the same, a transverse bar rigidly fastened on the top of said feeding mechanism and engaging in said grooved guides and holding said mechanism in register with the bore.

6. A device of the class described embracing a hydraulic weighing and feeding device comprising a cylinder, a piston therein, a piston-rod adapted to support and regulate the pressure of a tool in operation, a pivoted bail for supporting the same on the hoisting-tackle, grooved ways parallel with said cylinder and adapted to hold the feeding and weighing mechanism in axial alinement with the bore and means engaged in said grooved ways for preventing said feeding device from rotating.

7. A device of the class described embracing the hoisting-tackle, a hydraulic weighing and feeding device supported thereon and acting to regulate pressure of a tool at the bottom of the bore from zero to full weight of the tool and comprising a cylinder, a piston therein, a piston-rod projecting through the bottom of said cylinder, a pipe-rod, vertical grooved ways one on each side of the cylinder and extending parallel therewith between which the cylinder is supported in axial alinement with the bore, a bar rigidly engaged on the top of said cylinder and engaging in said grooved ways and means preventing the piston from rotating.

8. In a device of the class described the combination with a cylinder, a piston therein, a piston-rod projecting from said cylinder a plurality of grooved guides, means engaging said grooved guides for preventing rotation of said cylinder, means connecting said piston-rod with a drill-pipe, a pressure-pipe opening into said cylinder and a gage on said pipe whereby the amount of pressure may be ascertained.

9. In a device of the class described the combination with a pipe-rod and hoisting mechanism of a cylinder engaged thereto having a detachable top, a piston therein, a piston-rod projecting through the bottom of said cylinder and supporting the pipe-rod, means preventing said piston revolving in said cylinder, grooved guides, means engaged in said grooved guides preventing said cylinder from rotating, a pressure-pipe opening into said cylinder and means for determining the upward pressure exerted on the piston.

In testimony whereof I have hereunto subscribed my name in the presence of two subscribing witnesses.

JAMES R. SHARP.

Witnesses:
W. W. WITHENBURY,
WM. C. SMITH.